United States Patent Office 3,462,393
Patented Aug. 19, 1969

3,462,393
EPOXY RESIN WITH DIAMINE OF POLYOXYPROPYLENE GLYCOL AND METHOD OF CURE
Bobby Legler, Lake Jackson, Tex., assignor to The Dow Chemical Company, Midland, Mich., a corporation of Delaware
No Drawing. Continuation-in-part of application Ser. No. 108,316, May 8, 1961. This application May 5, 1967, Ser. No. 636,268
Int. Cl. C08g 30/14
U.S. Cl. 260—47          3 Claims

ABSTRACT OF THE DISCLOSURE

A method of making an improved cured epoxy resin product by admixing with a polyglycidyl ether of a phenolic compound a polyoxyalkylenepolyamine as described and claimed in U.S. Patent 3,236,895, and the cured epoxy resin product so made. The epoxy resin product is used in preparation of glass laminates.

---

This application is a continuation-in-part of application, Ser. No. 108,316, filed May 8, 1961 and now abandoned.

The invention is realted to an improved epoxy resin composition, to a novel method of curing such composition to convert it to a thermosetting resin, and to the resin so made which has improved flexural and elastomeric properties and exhibits greater tensile strength, elongation, and resistance to water absorption than were heretofore existent in known resins which possess comparable flexural properties.

Epoxy resin compositions herein concerned are glycidyl ethers prepared by reacting a molar excess of an epihalohydrin with an aromatic polyhydric compound in the presence of a dehydrohalogenating base in an aqueous medium and separating the glycidyl ether so made from the reaction mixture and by-product salt. The liquid or low melting epoxy resin thus produced has an average of more than one vicinal

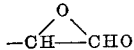

group per molecule. Reference is made to such groups as the oxido, oxirane, or ethoxyline groups. Upon admixture with such resin of a curing agent which effectuates cross-linking of the oxirane groups and thereafter allowing it to stand for a time, usually at somewhat above room temperature, the resin is converted to a tough, adhesive, water resistant, thermoset resin of wide and varied uses. The glycidyl ethers herein concerned contain an average of at least 1.5, and preferably an average of at least 1.8 vicinal terminal oxirane groups per molecule.

References which describe, in more-or-less detail, methods of preparing epoxy desins of the type concerned here include: Epoxy Resins by Irving Skeist, Reinhold Publishing Co. (1958) chapters 2 and 3; Epoxy Resins by Lee and Neville, McGraw-Hill Book Co., Inc. (1957) chapters 1 and 2; Dow Liquid Epoxy Resins and Dow Solid Epoxy Resins, Forms No. 170–67–5M–1060 and No. 170–70–6M–758, respectively, published by The Dow Chemical Company, Midland, Mich.; Epoxy, published by Jones-Dabney Co., Division of Devoe and Raynolds Co., Inc., Louisville, Ky.; and numerous U.S. patents among which are 2,582,985; 2,615,007; and 2,694,694. Known curing agents include alkyl and aryl primary, secondary, and tertiary amines, dicarboxylic acids and anhydrides thereof, Friedel-Crafts or Lewis acid-type catalysts, and inorganic hydroxides. Such known curing agents tend to form cured aromatic type epoxy resins which are too rigid for a number of uses.

Glycidyl ethers desirably containing an average of at least 1.8 oxirane groups per molecule are made by epoxidizing, by employing a molar excess of an epihalohydrin, an aromatic polyhydroxy compound of which the following are illustrative: 4,4'-dihydroxybenzophenone; 4,4'-isopropylidenediphenol; 4,4'-methylenediphenol; 4,4'-ethylidenediphenol; 4,4'-isobutylidenediphenol; 4,4' - sec. butylidenediphenol; 4,4' - isopropylidenebisalkylphenols, e.g. 4,4'-isopropylidenebis (3-methylphenol) and 4,4'-isopropylidenebis (t-butylphenol); 1,1'-(1-methylbutylidene) di-2-naphthol; 1,5-naphthalenediol; pyrogallol; phloroglucinol; novolacs; resorcinol; and hydroquinone.

4,4'-isopropylidenediphenol, a widely used polyphenol in the manufacture of epoxy resins of the type herein used, is often called bisphenol A.

An epoxy resin of the epoxy novolac type may be illustrated by a polyglycidyl ether of the following formula:

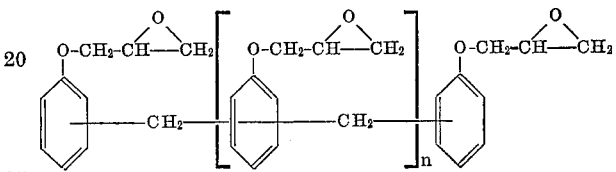

wherein $n$ is 0 to 5, usually between about 1 and 3. It is prepared by epoxidizing a phenol-formaldehyde novolac resin with an epihalohydrin. Details of such resins may be found in D. E. N. 438 Dow Epoxy Novolac Resin No. 170–143–4M–1162, obtainable from The Dow Chemical Company, Midland, Mich.

Attempts have been made to impart flexibility to such resins when cured, as by incorporating into the resin mixture certain plasticizers, sometimes also called lubricants. Although some success has been attained in making the resulting cured resins more flexible, such resins have exhibited undesirable tendencies to be more water absorbent, to suffer appreciable losses in tensile strength, and to have poorer dielectric properties. Such tendencies do not permit the use of such resins for many purposes, desipte their improved flexibility, because of the importance of low water absorption and satisfactory strength and dielectric properties. Other attempts have also frequently caused the resins to become undesirably viscous during mixing and therefore to require the use of a lubricating agent. The use of lubricants has often been disappointing because the lubricant, after the resin has set, sometimes migrates, causing discoloration and even leaving the resin, which as a result, becomes brittle on aging. A need, therefore, exists for a curing agent for use in an aromatic epoxy resin system which produces a flexible resin without objectionable sacrifice of other desirable properties.

The principal object of the invention, therefore, is to provide a method of curing polyfunctional glycidyl ethers of aromatic polyhydric phenolic compounds and the improved cured resin composition so made, which possess markedly improved flexural properties without having undergone the extent of loss in resistance to water absorption, strength, and the impairment of electrical properties heretofore usually exhibited by flexibilized epoxy resins. The manner of attaining this and related objects is made clear in the ensuing description and is concisely defined in the appended claims.

The invention, accordingly, contemplates an improved inherently flexible and elastomeric epoxy resin of high resistance to water absorption, of the aromatic epoxy type, wherein the flexible, elastomeric and water-resistant properties are provided by the curing agent employed.

The invention is carried out by admixing a polyglycidyl ether, previously prepared by reacting a molar excess of an epihalohydrin and an aromatic polyhydric phenolic compound in the presence of an alkaline dehydrohalogenating agent, in water, with a polyoxyalkylenepolyamine (sometimes called polyamine, polyalkyleneamine or polyglycolamine) of the type described and claimed in U.S. Patent 3,236,895. Curing is advantageously expedited by heating up to a temperature which will not scorch the resin, e.g. above about 225° C. However, moderate temperature is adequate, e.g. 50° C. to 150° C.

The polyoxyalkylenepolyamine employed as the curing agent in the practice of the invention is that consisting predominantly of the diamine having the generic formula:

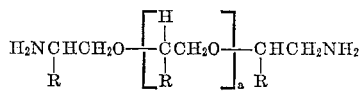

wherein each R represents an independently selected radical from the group consisting of hydrogen and lower alkyl radicals having from 1 to 6 carbon atoms and wherein $a$ represents an integer from 1 to 30. A number of such polyalkylenepolyamines are set out in U.S. Patent 3,236,895, e.g., in column 2, lines 41 to 72. Methods of preparation of the polyoxyalkylenepolyamines are well illustrated in said patent in Examples 4, 5, 6 and 8 to 12, columns 4 to 9, thereof.

Although adiamine is shown as the hardening agent in the formula above, it is understood that there is also present a varying minor proportion of monoamines as hydroxylamines wherein only one hydroxyl group of a glycol molecule has been replaced by the amino group. For satisfactory use in the practice of the invention, an average of at least about 3 or more amino hydrogen atoms per molecule should be present. Since the polyoxyalkyleneamine employed is usually substantially the diamine, in the interest of simplification of expression the amines employed will usually be referred to generally as polyoxyalkylenepolyamines.

The polyoxyalkylenepolyamine curing agent, as above described, is employed in the practice of the invention in an amount sufficient to provide between about 0.5 and about 2.0 equivalents of reactive amine hydrogen atoms per oxirane group present in the glycidyl ether. About 1 amine hydrogen atom per oxirane group is usually employed. The extent to which elastomeric properties are imparted to the cured resin product is controlled largely by the molecular weight of the curing agent employed. In the practice of the invention, the lower molecular weight curing agent produces a resin which has less pronounced elastomeric properties, whereas the higher molecular weight polyoxyalkylenepolyamine, i.e., the longer chain curing agent, produces a resin especially high in elastomeric properties.

Certain properties of epoxy resins vary, not only in accordance with the phenolic source of epoxidizable hydroxyl groups, but in accordance with the molar ratio of the epihalohydrin to the phenolic hydroxyl groups present. The molar ratio of epihalohydrin to phenolic hydroxyl groups employed to make the resins should be at least about two and when higher molecular weight epoxy resins are desired the ratio is increased from 4 to about 10. Epoxy resins derived from bisphenols have an average oxirane functionality approaching but not quite as great as two. It is usually not exactly two because an occasional terminal hydroxyl has not been epoxidized. A more realistic functionality is 1.8 to 1.9. Epoxy novolac resins may have an oxirane average functionality of greater than 2 to 6 (usually of something in excess of 2 to about 4). The relationship of functionality to molecular weight of an epoxy resin is often expressed as its epoxide equivalent weight which may be defined as the number of grams of the resin which is necessary to provide one gram mole weight of vicinal oxirane groups. Glycidyl ethers of bisphenol A for example, have epoxide equivalent weights of between about 174 and 1000.

The extent of softness of uncured epoxy resins is often expressed as a Durran's Softening Point value. Convenient workable resins usually do not have Durran's values of much in excess of about 110° C.

The polyoxyalkylenepolyamines may be employed to produce the cured resin of the invention which is elastomeric, adhesive to glass, transparent, resistant to water absorption and stable.

The following examples are illustrative of the practice of the invention.

EXAMPLE 1

110 parts of the glycidyl ether of 4,4'-isopropylidenediphenol (known generally as bisphenol A), having a Durran's softening point of less than 110° C. and an epoxide equivalent weight of between 175 and 179, were admixed with 87.2 parts by weight of the polyamine (largely the diamine) of polyoxypropylene glycol having a molecular weight of about 400 and which consisted of 5.75 percent primary amine groups. The curable resin so made was fluid and could be readily poured. It was cast into suitable shapes for testing. After curing overnight at room temperature, it was given a post cure at 120° C. for 4 hours.

The cured resin was clear and transparent. Specimens thereof were tested according to standard A.S.T.M. tests. The following properties were obtained.

| Test: | Value |
|---|---|
| Compressive yield strength _____p.s.i__ | 2700 |
| Tensile strength _____p.s.i__ | 2300 |
| Elongation at break _____percent__ | 178 |
| Izod impact, per inch of notch _____pound__ | 2.5 |
| Dielectric constant _____ | 3.23 |
| Power factor _____ | 0.032 |
| Arc resistance _____seconds__ | 35 |

The above test results showed the resin to be highly elastomeric, to have good resistance to tear and to have good electrical properties.

EXAMPLE 2

A second example, employing the glycidyl ether employed in Example 1, was run but wherein an amine of polyoxypropylene glycol, having an average molecular weight of about 200 was used. The amine, as above, described, consisted predominantly of the diamine. It was employed in an amount sufficient to provide about 1 amino hydrogen atom per oxirane group. The composition satisfactorily cured at 70° C.

EXAMPLE 3

17.5 parts of the glycidyl ether of 4,4'-isopropylidenediphenol employed in Example 1 were admixed with 13.2 parts by weight of the polyoxyalkylenepolyamine employed in Example 1 and the resulting admixture poured between two facing mating parallel glass sheets spaced apart about 0.06 inch. The thus laminated structure so prepared was placed in an oven for 45 minutes at 120° C. to effect a cure. The so cured laminar structure was removed from the oven and examined. The resin was clear and free from color. The laminar structure transmitted images therethrough without distortion or noticeable diminution of intensity or contrast. The laminar structure was then subjected to a temperature cycle alternating between —70° F. and 160° F. The resin adhesive showed no indication of weakening of bond with the glass. There was no effect on the clarity or transparency of the laminar structure as a result of the extremes of temperature.

EXAMPLE 4

Resin compositions of comparable proportions of the glycidyl ether and the polyamine of polyoxypropyleneglycol employed in the above example were subjected to Fadeometer tests, both as cast films and as the adhesive resin in glass laminar structures. The resin showed satisfactory resistance to any color change or adverse effects due to exposure in accordance with the light test.

EXAMPLES 5-7

A series of examples was run employing portions of a glycidyl ether of 4,4'-isopropylidenediphenol and epichlorohydrin, having an epoxide equivalent weight of between 187 and 193 and a Durran's softening point of less than 110° C. The resins were admixed with varying amounts of polyamines of polyoxypropyleneglycol of varying molecular weights as set out in Table I, infra.

The examples were run by admixing 100 parts of the glycidyl ether with the curing agent as defined in Table I below. The resulting admixture was cured according to the conditions set out in Table I. Specimens of the cured resin were tested according to standard A.S.T.M. tests, the results of which are also shown in Table I.

TABLE I

| Example No. | Glycidyl ether in parts by weight | Polyamine [1] of— | Parts by weight | At room temperature [2] (hours) | At 100° C. [3] (min.) | Shore D hardness scale | Tensile in p.s.i. | Percent water absorption during 336 hr. [4] |
|---|---|---|---|---|---|---|---|---|
| 5 | 100 | Polyoxypropylene glycol, avg. M.W. =192. | 23 | 24 | 3 | 89 | 9,600 | 1.07 |
| 6 | 100 | Polyoxypropylene glycol, avg. M.W. =250. | 40 | 24 | 7 | 89 | 7,300 | 1.24 |
| 7 | 100 | Polyoxypropylene glycol, avg. M.W. =400. | 66.6 | 64 | 15 | 84 | 1,500 | 3.09 |

[1] Substantially the diamine.
[2] Room temperature gels were run on 50-gram samples.
[3] 100° C. gels were run on 25-gram samples.
[4] Water absorption is expressed as: $\frac{\text{increase in weight}}{\text{original weight}} \times 100 =$ percent water absorbed Reference to the table shows that polyoxypropylenepolyamines of varying molecular weights and in varying amounts cure the polyglycidyl ether (substantially the diglycidyl ether) of isopropylidenediphenol to a cured resin having excellent resistance to water absorption. It also shows that, although increased amounts of higher molecular weight polyoxypropylenepolyamine resulted in decreased tensile strength, that the Shore D hardness values did not lessen appreciably.

EXAMPLE 8

This example illustrates the use of a polyfunctional glycidyl ether of a mononuclear polyhydric compound, cured by a relatively high molecular weight polyoxyalkylenepolyamine, to produce a transparent elastomeric resin and a transparent laminar structure employing the resin as the adhesive therefor.

128 grams of the glycidyl ether of resorcinol and 230 grams of the polyamine of polyoxypropylene glycol, having a molecular weight of 750, were heated in separate containers to 150° C. and mixed together at that temperature. The resulting mixture was poured between two mating parallel glass sheets positioned about 0.06 inch apart and the laminar structure so made allowed to stand overnight at 150° F. Upon examination, the laminar structure was clear and transparent, transmitting images therethrough without detectable distortion, lessening of detail, or interference with color. When the glass was broken by sudden force, the bonds formed between the glass and resin withstood breakage, retaining the pieces of broken glass in place, showing shatterproof properties. The observed strength, elasticity, clarity, and cohesion to glass indicated extensive adaptability to such uses as lamination of protective safety glass panels to the viewing face of television and radar screens.

Numerous advantages of the resin of the invention are apparent by referring to the above examples. Adequate resistance to water-absorption, good electrical properties, and high cohesion to solid surface are combined with excellent clarity, transparency, and flexibility. Laminar structures employing the resin as the adhesive show that it maintains bonds with laminae of the structure despite impact or shock thereto.

Having described my invention, what I claim and desire to protect by Letters Patent is:

1. The method of curing a polyglycidyl ether having an average of at least 1.5 terminal vicinal oxirane groups per molecule, selected from the class consisting of (a) glycidyl ethers of diphenols, having an epoxide equivalent weight of between about 174 and about 975, (b) polyglycidyl ethers of novolac resins, (c) mixtures thereof, and (d) such phenolic ethers in admixture with up to 20 percent by weight thereof of a glycidyl ether of a polyoxyalkyleneglycol selected from the class consisting of polyoxypropyleneglycol ethers and polyoxybutyleneglycol ethers and mixtures thereof having an average of at least 1.5 terminal vicinal epoxide groups per molecule and a molecular weight of between about 134 and about 2,000, consisting of (1) admixing therewith a compound capable of effecting cross-linking of said oxirane groups and consisting essentially of the diamine of polyoxypropyleneglycol having an average molecular weight of between about 192 and about 400 and being present in an amount sufficient to provide between about 0.5 and 2.0 amine hydrogen atoms per vicinal oxirane group present, and (2) curing the resulting admixture at between room temperature and about 200° C. for a time sufficient for the amine groups to react with said oxirane groups to provide a thermoset, elastomeric water-resistant resin.

2. The method of curing an epoxy resin composition according to claim 1 wherein about one reactive amine hydrogen atom is provided per oxirane group.

3. The elastomeric water-resistant thermoset resin, consisting of the reaction product of (1) a polyglycidyl ether selected from the class consisting of (a) glycidyl ethers of diphenols, said ether having an average of at least 1.5 terminal vicinal oxirane groups per molecule and an epoxide equivalent weight of between about 174 and about 1,000, (b) polyglycidal ethers of novolac resins and (c) mixtures thereof and (2) a polyoxypropylene glycol amine consisting essentially of the diamine having the formula:

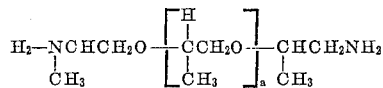

wherein $a$ represents an integer of 1 to about 3, and being present in an amount sufficient to provide between about 0.5 and about 2.0 equivalents of reactive amine hydrogen atoms per oxirane group present in the glycidyl ether.

References Cited

UNITED STATES PATENTS

| | | |
|---|---|---|
| 2,982,751 | 5/1961 | Anthes. |
| 3,236,895 | 2/1966 | Lee et al. |
| 3,316,185 | 4/1967 | Reinking. |

WILLIAM H. SHORT, Primary Examiner

T. PERTILLA, Assistant Examiner

U.S. Cl. X.R.

117—124; 161—185; 260—59, 830